United States Patent
Chiu

(10) Patent No.: US 7,443,546 B2
(45) Date of Patent: Oct. 28, 2008

(54) METHOD FOR GENERATING A CALIBRATION CURVE

(75) Inventor: Chui-Kuei Chiu, Hsin-Chu (TW)

(73) Assignee: Transpacific IP, Ltd., Taipei (TW)

(*) Notice: Subject to any disclaimer, the term of this patent is extended or adjusted under 35 U.S.C. 154(b) by 0 days.

(21) Appl. No.: 11/468,786

(22) Filed: Aug. 31, 2006

(65) Prior Publication Data

US 2007/0146750 A1    Jun. 28, 2007

Related U.S. Application Data

(63) Continuation of application No. 10/233,592, filed on Sep. 4, 2002, now Pat. No. 7,158,267.

(51) Int. Cl.
H04N 1/00 (2006.01)
H04N 1/46 (2006.01)
H04N 9/64 (2006.01)
G06K 9/38 (2006.01)
H01L 27/00 (2006.01)

(52) U.S. Cl. ........... 358/406; 358/504; 382/274; 250/208.1

(58) Field of Classification Search .......... 358/406, 358/504; 382/274, 272, 270; 348/251; 250/208.1
See application file for complete search history.

(56) References Cited

U.S. PATENT DOCUMENTS 5,062,144 A * 10/1991 Murakami ........... 382/274
5,266,804 A * 11/1993 Shimizu ........... 250/584
5,801,962 A    9/1998 Sheu et al.

* cited by examiner

Primary Examiner—Houshang Safaipour
(74) Attorney, Agent, or Firm—Stolowitz Ford Cowger LLP

(57) ABSTRACT

A method for generating a calibration curve is disclosed. The method comprises the following steps. Calibration data of one line image of a previous scan are first provided. Reference pixels are selected from the image line. Then a calibration board is scanned and calibration data of the reference pixels are generated. Calibration data of the reference pixels of a previous scan are then selected from the calibration data of one image line of a previous scan. Ratios of the calibration data of the reference pixels and the calibration data of the reference pixels of a previous scan are calculated. Calibration data of all pixels of the image line are finally generated by multiplying the calibration data of the image fine of a previous scan and the ratios.

23 Claims, 3 Drawing Sheets

METHOD FOR GENERATING A CALIBRATION CURVE

REFERENCE TO RELATED APPLICATION

The application is a continuation of U.S. application Ser. No. 10/233,592, filed on Sep. 4, 2002, for "METHOD FOR GENERATING CALIBRATION CURVE", now U.S. Pat. No. 7,158,267.

BACKGROUND OF THE INVENTION

1. Field of the Invention

The present invention relates to a method for generating a calibration curve, and more particularly to a method for generating a calibration curve by selecting reference points of one image line instead of all points.

2. Description of the Related Art

Optical scanners are used to capture and digitize images. For example, an optical scanner can be used to capture the image of printed matter on a sheet of paper. The digitized image can then be electronically stored and/or processed with character recognition software to produce ASCII text. The typical optical scanner includes a light source, a linear array of photoelectric sensing elements (generally a CCD sensor or a CMOS sensor, or a CIS sensor), an analog amplifier, an analog to digital converter (ADC), a controller and a random access memory (RAM).

The CCD sensor includes a large number (e.g., 2000) of photoelectric sensing elements arranged in a linear array. Each photoelectric sensing element will capture light representing a single pixel of the image. The array will capture a line of pixels. By moving the CCD sensor across a document, the entire document can be scanned one line at a time.

The conversion into digital signals of light reflected from or transmitted through the document takes place in essentially three steps. First, each photoelectric sensing element will convert the light which it receives into an electric charge. The magnitude of the charge will depend on the intensity of the light and the exposure time. Second, the charges from each of the photoelectric sensing elements are converted into analog voltages via the analog amplifier. Finally, the analog voltages are digitized by the analog to digital converter for digital image processing and storage in the RAM.

In a conventional image scanner, calibration is necessarily performed before scanning images. This is because the conditions of the image components of an image scanner usually alter in every scanning. For example, the brightness of the light source comprising a cold-cathode fluorescent lamp (CCFL) usually varies with duration of turn-on, environment temperature, and even its location. Moreover, linear image sensors such as CCD will not be identical and always respond differently to the same light signal. A total white calibration board or a full black calibration board is conventionally used to generate a shading curve or calibration curve. By scanning the white calibration board or full black calibration board, a user can obtain a calibration curve showing how the bright level of the generated image varies with pixel positions of one image line. The data of this calibration curve are then used to calculate or to generate calibration data corresponding to each image sensor or CCD. However, the above mentioned calibration method has some troubling drawbacks. For example, a linear image array may have many sensors or may be 10,000 sensors for each of red, green and blue (RGB) colors constituting one image line. If 32 image lines are chosen to generate calibration curves, then there are 10,000 (pixels)×3 (RGB)×32 (lines)=960,000 pixels to be processed. Each pixel comprises 1 to 2 bytes of data and each byte represents a level value from 0 to 255. It is apparent that such a huge data quantity to be processed would drag the speed and performance of an image sensor. Some conventional image scanners skip generating a calibration curve before every scanning and utilize the previous calibration curve to generate calibration data. However, the previous calibration curve always differs from the present calibration curve since the conditions of the components of an image scanner usually alter in every scanning.

Hence it is desirable to provide a method for generating a calibration curve so as to render an operator or a manufacturer of an image scanner easier and more effective to calibrate images generated by the image scanner.

SUMMARY OF THE INVENTION

It is therefore an object of the invention to provide a method for generating a calibration curve with minimum calibration data necessary to be processed.

It is another object of this invention to provide a method for generating a calibration curve with high efficiency and performance.

To achieve these objects and in accordance with the purpose of the invention, the invention provides a method for generating a calibration curve. The method comprises the following steps. Calibration data of one line image of a previous scan are first provided. Reference pixels are selected from the image line. Then a calibration board is scanned and calibration data of the reference pixels are generated. Calibration data of the reference pixels of a previous scan are then selected from the calibration data of one image line of a previous scan. Ratios of the calibration data of the reference pixels and the calibration data of the reference pixels of a previous scan are calculated. Calibration data of all pixels of the image line are finally generated by multiplying the calibration data of the image line of a previous scan and the ratios.

It is to be understood that both the foregoing general description and the following detailed description are exemplary and explanatory only and are not restrictive of the invention, as claimed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

It is to be understood and appreciated that the method described below does not cover a complete system and method. The present invention can be practiced in conjunction with various software and hardware that are used in the art, and only so much of the commonly practiced components and steps are included herein as are necessary to provide an understanding of the present invention.

The present invention will be described in detail with reference to the accompanying drawings. It should be noted that the drawings are in greatly simplified form.

Figure 1:
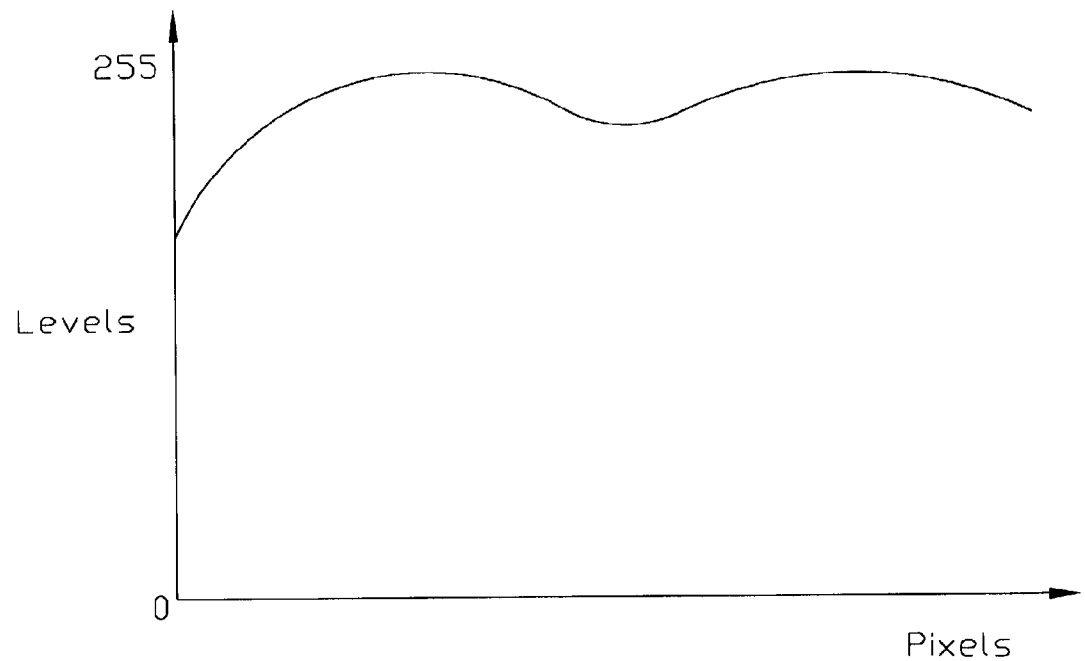
FIG. 1 shows a calibration curve of one image line.
Figure 2:
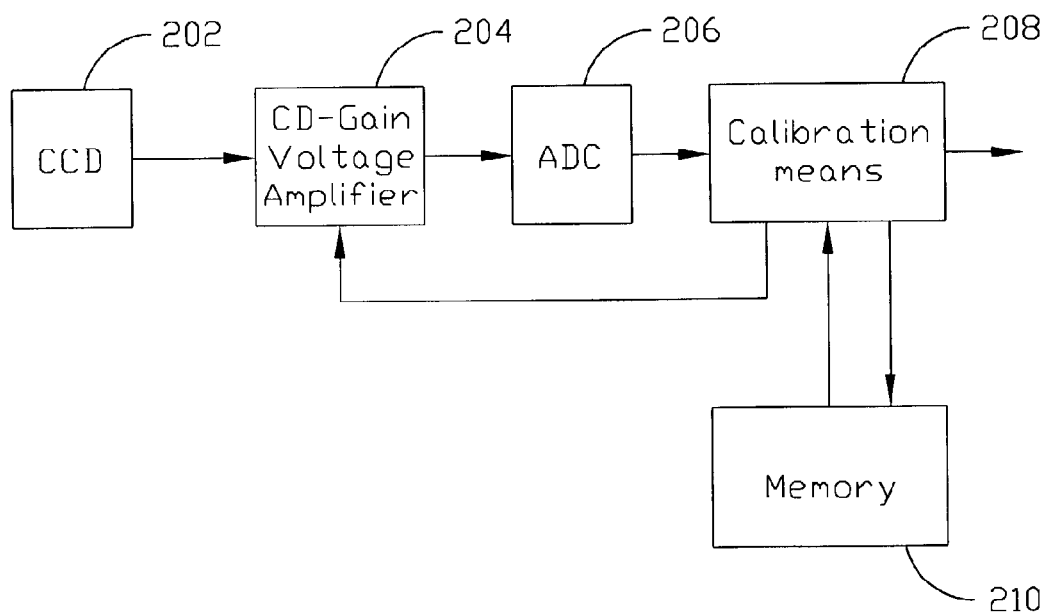
FIG. 2 shows a calibration functional block diagram of a in an image scanner.

Referring the FIG. 1, a calibration curve of how the bright levels of the generated image vary with pixel positions of one line image is shown. This curve is generated by scanning a total white calibration board to generate calibration data corresponding to each image sensor or CCD before scanning images formally. Normally, a calibration curve used to calibrate images is generated by selecting data of a plurality of image lines and averaging the data after scanning a calibration board. Referring to FIG. 2, a calibration functional block diagram of an image scanner of this invention is shown. A light beam reflected from the surface of a scanned calibration board exposes on CCD 202 and then is then converted to voltage signals by CCD 202. The voltage signals are then adjusted by a DC gain voltage amplifier 204 and the adjusted voltage signals are next converted to digital signals by an analog-to-digital converter 206. The digital signals are then calculated to generate calibration data corresponding to each CCD sensor by a calibration means 208. The calibration data are then stored in memory 210.

Figure 3:
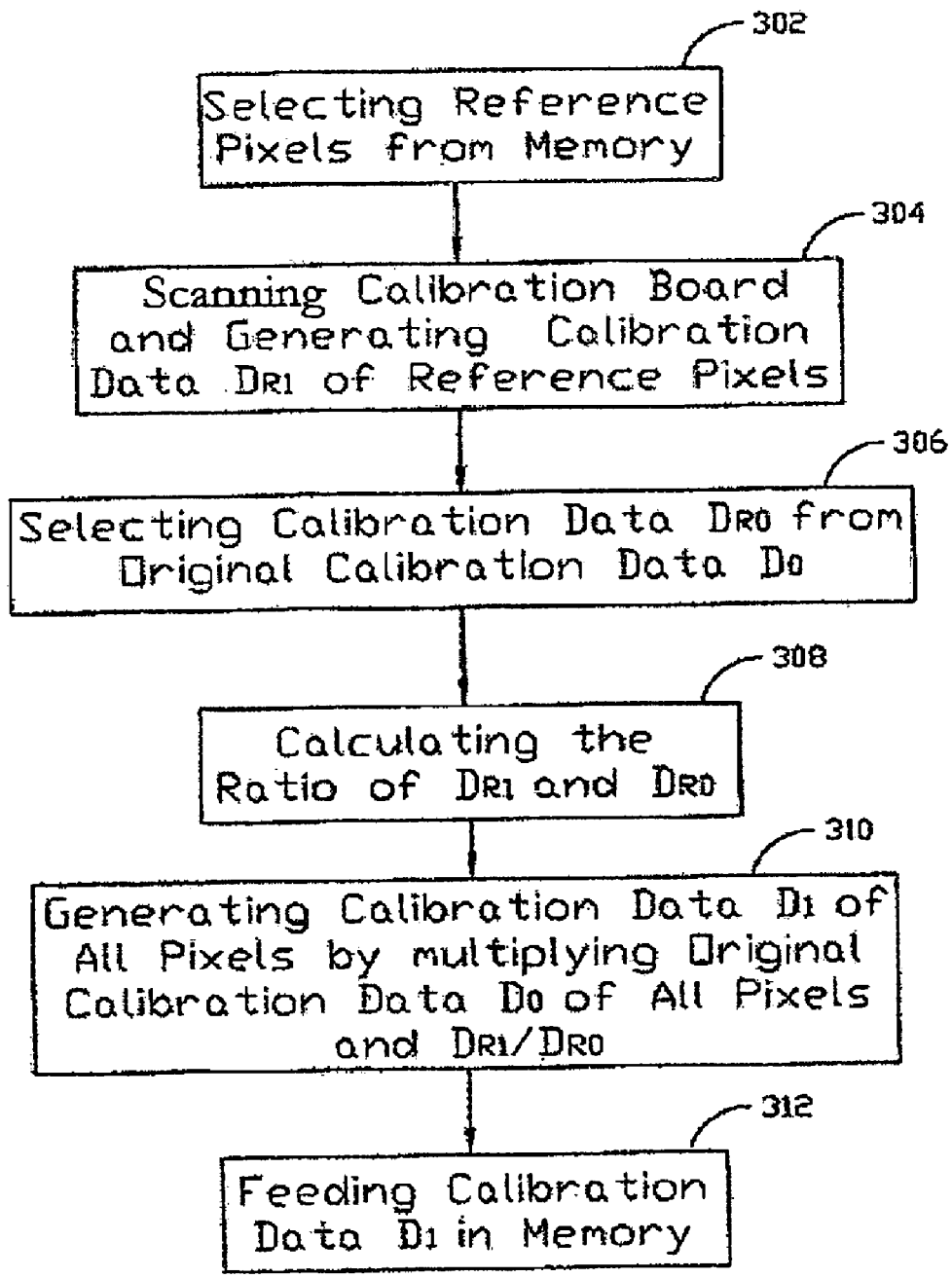
FIG. 3 shows a flow chart of this invention.
Figure 4:
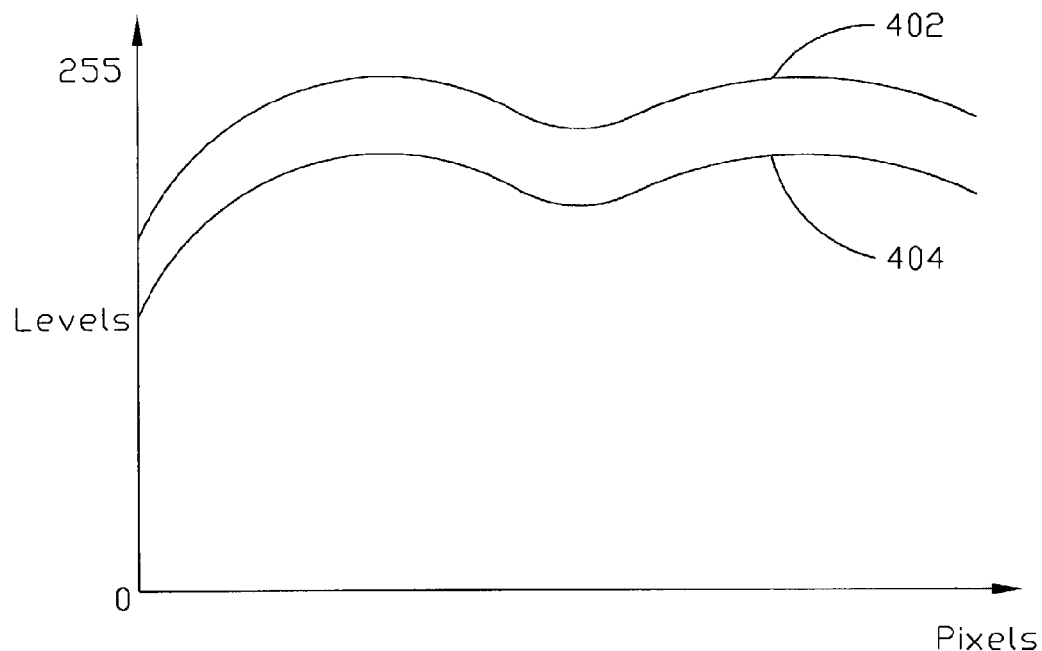
FIG. 4 shows the original calibration curve of the previous scan and a new calibration curve generated by the method of this invention.

FIG. 3 shows a flow chart of this invention. Before performing the method of this invention, a calibration curve and calibration data corresponding to every CCD image sensor of a previous scan must be established and stored in memory 210. As mentioned in the background of the invention, a total white calibration board or a full black calibration board is scanned to obtain the calibration curve showing how the bright level of the generated image varies with pixel positions of one image line. The data of this calibration curve are then used to calculate or to generate calibration data $D_0$ corresponding to each image sensor or CCD. This calibration data $D_0$ is stored in memory 210. When another image scan is going to be performed, a new calibration curve must be generated since the conditions of the components of an image scanner usually alter in every scanning. The method of this invention first selects several reference pixels of one image line instead of all pixels in step 302. Then a calibration board is scanned and calibration data $D_{R1}$ of the reference pixels are generated via the conventional process mentioned above in step 304. Next original calibration data $D_{R0}$ of the reference pixels are selected from calibration data $D_0$ by the calibration means 208 in step 306. The ratio of calibration data $D_{R1}$ of the reference pixels and original calibration data $D_{R0}$ of the reference pixels is calculated by the calibration means 208 in step 308. Calibration data $D_1$ of this scan corresponding to every CCD sensor can be generated by multiplying calibration data $D_0$ of all pixels and the ratio of $D_{R1}$ and $D_{R0}$ or $D_{R1}/D_{R0}$ by the calibration means 208 in step 310. For linear CCD sensors, the ratio of $D_{R1}$ and $D_{R0}$ or $D_{R1}/D_{R0}$ is a constant value. The calibration data in D1 are then fed in memory 210 from the calibration means 208 in step 312. A new calibration curve can then be obtained by selecting 32 image lines (for example) and averaging calibration data $D_1$ of the 32 image lines. When formally scanning an image or a document, the light signals reflected from the image or document are received and converted to voltage signals by the CCD 202. The voltage signals are then adjusted by the DC gain voltage amplifier 204 and the adjusted voltage signals are next converted to digital signals by the analog-to-digital converter 206. When the digital signals are fed in the calibration means 208, the averaged calibration data $D_1$ are also accessed from memory 210 and a calibration process is performed by using the digital signals and the averaged calibration data $D_1$ to generate image signals for further image processing. FIG. 4 shows an original calibration curve 404 generated by the method of this invention.

In another embodiment of this invention, the step 308 can be changed to calculating $D_{R0}/D_{R1}$ or the reciprocal of $D_{R1}/D_{R0}$ and the step 310 can be omitted. The reciprocal of $D_{R1}/D_{R0}$ or $D_{R0}/D_{R1}$ is then fed in the DC gain voltage amplifier 204 by the calibration means 208. When formally scanning an image or a document, the light signals reflected from the image or document are received and converted to voltage signals by the CCD 202. The voltage signals are then adjusted by the DC gain voltage amplifier 204 and the adjusted voltage signals corresponding each pixels multiply $D_{R0}/D_{R1}$ or the reciprocal of $D_{R1}/D_{R0}$. The adjusted voltage signals are next converted to digital signals by the analog-to-digital converter 206. The digital signals are fed in the calibration means 208 and a calibration process is performed to generate image signals for further image processing.

Figure 5:
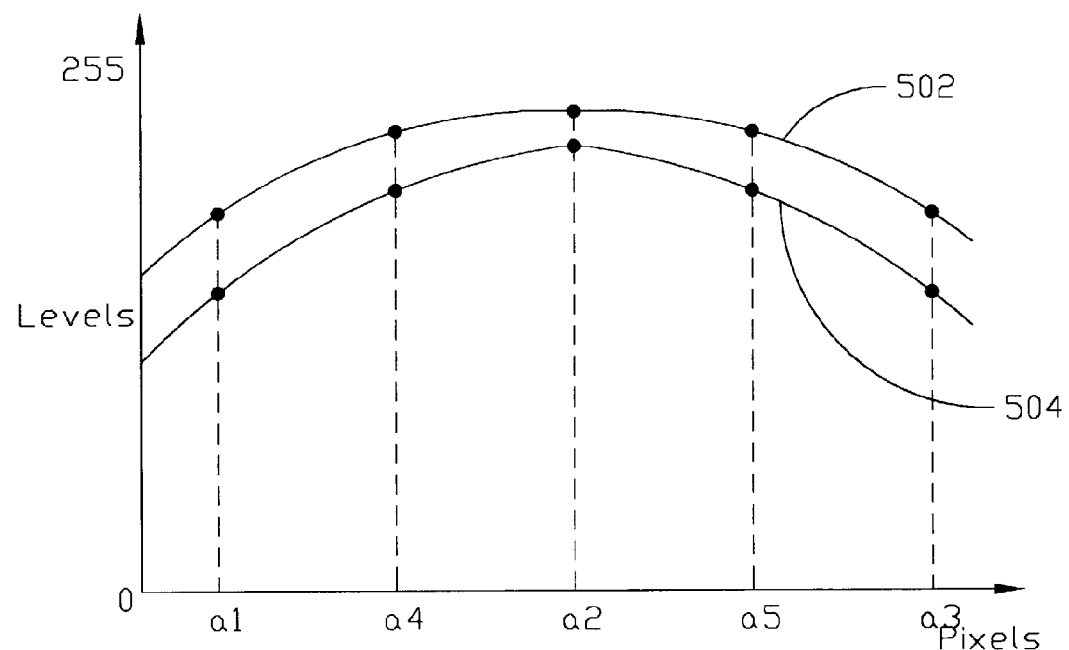
FIG. 5 shows the original calibration curve of the previous scan and a new calibration curve generated by the method of this invention.

However, for non-linear CCD sensors, the ratio of $D_{R1}$ and $D_{R0}$ or $D_{R1}/D_{R0}$ is not a constant value. The ratios of calibration data $D_{R1}$ and original calibration data $D_{R0}$ of the reference pixels obtained by the method mentioned above are used to calculate the ratio of calibration data $D_{R1}$ and original calibration data $D_{R0}$ of the pixel between two reference pixels by an interpolation method. FIG. 5 shows an original calibration curve 502 of the previous scan and a new calibration curve 504. As shown in FIG. 5, reference pixels $a_1$, $a_2$ and $a_3$ are selected and the calibration data $D_{R1-a1}$, $D_{R1-a2}$ and $D_{R1-a3}$ are generated by scanning a calibration board. The ratios of calibration data $D_{R1}$ and original calibration data $D_{R0}$ of the reference pixels $a_1$, $a_2$ and $a_3$ can be calculated by using the original calibration data $D_{R0-a1}$, $D_{R0-a2}$ and $D_{R0-a3}$, and the calibration data $D_{R1-a1}$, $D_{R1-a2}$ and $D_{R1-a3}$ of the reference pixels $a_1$, $a_2$ and $a_3$. The ratios of calibration data $D_{R1}$ and original calibration data $D_{R0}$ of the pixels $a_4$ and $a_5$ are calculated by an interpolation method. The ratios of calibration data $D_{R1}$, and original calibration data $D_{R0}$ of the rest of the pixels are calculated by an interpolation method so that a new calibration curve 504 can be obtained.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claim is:

1. A method comprising:
    selecting one or more reference pixels corresponding to an image line from a previous scan, the one or more reference pixels associated with previous calibration data;
    scanning a calibration board to generate calibration data for the one or more reference pixels, wherein the one or more reference pixels number fewer than all pixels of the image line associated with the previous calibration data; and
    calculating a ratio comprising the generated calibration data and said the previous calibration data corresponding to the one or more reference pixels to generate a calibration curve.

2. The method of claim 1, further comprising multiplying the ratio by calibration data for all pixels of the calibration board.

3. The method of claim 2, further comprising:
    selecting image lines corresponding to at least some of the pixels of the calibration board other than the one or more reference pixels; and averaging calibration data for the selected image lines to generate the calibration curve.

4. The method of claim 1, further comprising:
converting light signals reflecting from a scanned image to one or more analog voltage signals;
adjusting the analog voltage signals according to the ratio;
converting the analog voltage signals to digital voltage signals; and
calibrating the digital voltage signals.

5. The method of claim 1, wherein the ratio is a constant value.

6. The method of claim 4, further comprising interpolating a portion of the calibration curve corresponding to one or more additional pixels located between the reference pixels.

7. A system comprising:
memory operable to store first calibration data corresponding to one or more reference pixels in an image line from a previous scan, wherein the one or more reference pixels number fewer than all pixels of the image line from the previous scan;
one or more image sensors operable to scan a calibration board; and
a calibration unit operable to:
generate second calibration data for the one or more reference pixels, and
calculate one or more ratios of comprising the first calibration data and the second calibration data to calibrate the one or more image sensors.

8. The system of claim 7, wherein the one or more ratios are used to generate a calibration curve.

9. The system of claim 7, wherein the one or more ratios do not equate to a constant value.

10. The system of claim 7, wherein the memory is further operable to store complete pixel calibration data of the entire calibration board from the previous scan, and wherein the calibration unit is further operable to multiply the one or more ratios by the complete pixel calibration data.

11. The system of claim 8, wherein the calibration unit is further operable to:
select image lines corresponding to at least some of the pixels of the calibration board other than the one or more reference pixels, and
average calibration data for the at least some pixels of the selected image lines to generate the calibration curve.

12. The system of claim 8, wherein the calibration unit is further operable to generate calibration data for one or more additional pixels in the image line by interpolating a portion of the calibration curve corresponding to the one or more additional pixels based on the one or more ratios.

13. A calibration unit configured to calibrate one or more sensors of a scanner, the calibration unit operable to:
select one or more reference pixels from stored calibration data, corresponding to an image line from a previous scan, wherein the one or more reference pixels number fewer than all pixels of the image line from the previous scan;
generate calibration data for the one or more reference pixels;
calculate a ratio of the generated calibration data and the stored calibration data; and
generate a calibration curve.

14. The calibration unit of claim 13, wherein the calculated ratio is used to generate a calibration curve.

15. The calibration unit of claim 13, wherein the calculated ratio is a constant value.

16. The calibration unit of claim 13, wherein said calibration unit is further operable to generate calibration data for one or more additional pixels by multiplying calibration data corresponding to a different image line from the previous scan by the calculated ratio.

17. The calibration unit of claim 14, wherein said calibration unit is further operable to generate calibration data for one or more additional pixels by interpolating a portion of the calibration curve corresponding to the one or more additional pixels based on the the calculated ratio.

18. A system comprising:
means for storing calibration data corresponding to an image line from a previous scan;
means for selecting one or more reference pixels from the image line;
means scanning a calibration board;
means for generating calibration data for the one or more reference pixels, wherein the one or more reference pixels number fewer than all pixels of the image line associated with the calibration board;
means for calculating a ratio comprising the generated calibration data and the stored calibration data; and
means for generating a calibration curve using the one or more ratios.

19. The system of claim 18, further comprising:
means for selecting image lines corresponding to at least some of the pixels of the calibration board other than the one or more reference pixels; and
means for averaging calibration data for the selected image lines to generate the calibration curve.

20. The system of claim 18, wherein the calculated ratio is not a constant value.

21. The system of claim 18, further comprising:
means for converting light signals reflected from a scanned image to one or more analog voltage signals;
means for adjusting the analog voltage signals according to the ratio; and
means for converting the analog voltage signals to digital voltage signals.

22. The system of claim 18, and further comprising means for generating calibration data for one or more additional pixels by multiplying the stored calibration data by the calculated ratio.

23. The system of claim 19, further comprising means for generating calibration data for one or more additional pixels by interpolating a portion of the calibration curve corresponding to the one or more additional pixels based on the calculated ratio.

* * * * *

UNITED STATES PATENT AND TRADEMARK OFFICE
CERTIFICATE OF CORRECTION

PATENT NO. : 7,443,546 B2  
APPLICATION NO. : 11/468786  
DATED : October 28, 2008  
INVENTOR(S) : Chui-Kuei Chiu It is certified that error appears in the above-identified patent and that said Letters Patent is hereby corrected as shown below:

Title Pg, Item (57) (Abstract), line 3, delete "line image" and insert -- image line --, therefor.

Title Pg, Item (57) (Abstract), line 12, delete "fine" and insert -- line --, therefor.

At column 4, line 58, after "and" delete "said".

At column 5, line 53, after "data" delete ",".

At column 6, line 17, delete "the the" and insert -- the --, therefor.

At column 6, line 23, after "means" insert -- for --.

At column 6, line 48, delete "18, and" and insert -- 18, --, therefor.

Signed and Sealed this

First Day of September, 2009

David J. Kappos
*Director of the United States Patent and Trademark Office*